US011228528B2

(12) United States Patent
Guo et al.

(10) Patent No.: US 11,228,528 B2
(45) Date of Patent: Jan. 18, 2022

(54) ADAPTIVE LOAD BALANCING BETWEEN ROUTERS IN WAN OVERLAY NETWORKS USING TELEMETRY INFORMATION

(71) Applicant: Arista Networks, Inc., Santa Clara, CA (US)

(72) Inventors: Xiangyi Guo, San Jose, CA (US); Wei Dai, San Jose, CA (US); Abhijith Kudupu Narayan, Austin, TX (US); Babu Neelam, San Jose, CA (US); Udayakumar Srinivasan, Fremont, CA (US); Kumaran Narayanan, San Ramon, CA (US)

(73) Assignee: Arista Networks, Inc., Santa Clara, CA (US)

( * ) Notice: Subject to any disclaimer, the term of this patent is extended or adjusted under 35 U.S.C. 154(b) by 17 days.

(21) Appl. No.: 16/809,210

(22) Filed: Mar. 4, 2020

(65) Prior Publication Data

US 2021/0281514 A1    Sep. 9, 2021

(51) Int. Cl.
*H04L 12/803* (2013.01)
*H04L 12/721* (2013.01)
*H04L 12/707* (2013.01)
*H04L 12/24* (2006.01)
*H04L 12/863* (2013.01)
*H04L 12/911* (2013.01)

(52) U.S. Cl.
CPC ........ *H04L 47/125* (2013.01); *H04L 41/0896* (2013.01); *H04L 45/124* (2013.01); *H04L 45/24* (2013.01); *H04L 45/70* (2013.01); *H04L 47/6225* (2013.01); *H04L 47/822* (2013.01)

(58) Field of Classification Search
CPC ..... H04L 45/02; H04L 45/121; H04L 45/123; H04L 45/124; H04L 45/125; H04L 45/24; H04L 47/125; H04L 47/193; H04L 47/28; H04L 47/283
See application file for complete search history.

(56) References Cited

U.S. PATENT DOCUMENTS

| | | | |
|---|---|---|---|
| 9,923,798 B1* | 3/2018 | Bahadur | H04L 45/24 |
| 2005/0185621 A1 | 8/2005 | Sivakumar et al. | |
| 2007/0214280 A1 | 9/2007 | Patel et al. | |
| 2008/0123532 A1* | 5/2008 | Ward | H04L 45/125 370/238 |

(Continued)

OTHER PUBLICATIONS

Mathis et al., "the macroscopic behavior of the TCP congestion avoidance algorithm," published in Jul. 1997, and found at http://ccr.sigcomm.org/archive/1997/jul97/ccr-9707-mathis.pdf.

(Continued)

*Primary Examiner* — Pao Sinkantarakorn
(74) *Attorney, Agent, or Firm* — Chamberlain, Hrdlicka, White, Williams & Aughtry

(57) ABSTRACT

Systems and methods for load balancing in a network are disclosed. An illustrative method includes receiving network telemetry data corresponding to network paths of a plurality of coexisting multipaths, performing an adaptive load balancing process by determining whether a network path from the plurality of coexisting multipaths is an adequate network path based on the network telemetry data, and in response to determining the network path is an adequate network path, selecting the network path for a network flow.

23 Claims, 11 Drawing Sheets

(56) References Cited

U.S. PATENT DOCUMENTS

| | | | |
|---|---|---|---|
| 2010/0149979 A1* | 6/2010 | Denecheau | H04L 45/124 370/234 |
| 2013/0286846 A1* | 10/2013 | Atlas | H04L 45/125 370/236 |
| 2016/0294681 A1 | 10/2016 | Khakpour et al. | |
| 2019/0386924 A1* | 12/2019 | Srinivasan | H04L 47/115 |

OTHER PUBLICATIONS

Ye, Jin-Li, et al., "A Weighted ECMP Load Balancing Scheme for Data Centers Using P4 Switches", Ye Jin-Li et al: "A Weighted ECMP Load Balancing Scheme for Data Centers Using P4 Switches", 2018 IEEE 7th International Conference on Cloud Networking (CLOUDNET), IEEE, Oct. 22, 2018, 1-4.

* cited by examiner

Path Telemetry

| PathId | Latency | Jitter | Loss |
|--------|---------|--------|------|
| Path1  | 11      | 10     | 0    |
| Path2  | 40      | 9      | 0    |
| Path3  | 30      | 15     | 0    |

Best Path(s): Path1

FIG. 2C

Path Telemetry

| PathId | Latency | Jitter | Loss |
|--------|---------|--------|------|
| *Path1*  | *60*      | 10     | 0    |
| Path2  | 40      | 9      | 0    |
| Path3  | 30      | 15     | 0    |

Best Path(s): Path2, Path3

FIG. 2D

Path Telemetry

| PathId | Latency | Jitter | Loss |
|---|---|---|---|
| *Path1* | *51* | 10 | 0 |
| Path2 | 40 | 9 | 0 |
| *Path3* | 49 | 17 | *0.01* |

Best Path(s): Path2

FIG. 2E

Path Telemetry

| PathId | Latency | Jitter | Loss |
|---|---|---|---|
| *Path1* | *55* | 10 | *0.02* |
| *Path2* | 50 | 14 | *0.01* |
| *Path3* | 65 | 18 | *0.10* |

Best Path(s): Path2

FIG. 2F

ADAPTIVE LOAD BALANCING BETWEEN ROUTERS IN WAN OVERLAY NETWORKS USING TELEMETRY INFORMATION

BACKGROUND

The present disclosure relates to load balancing in computer networks.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIGS. 2C-2F show example path telemetry characteristics tables, in accordance with some embodiments of the disclosure;

DETAILED DESCRIPTION

Figure 1:
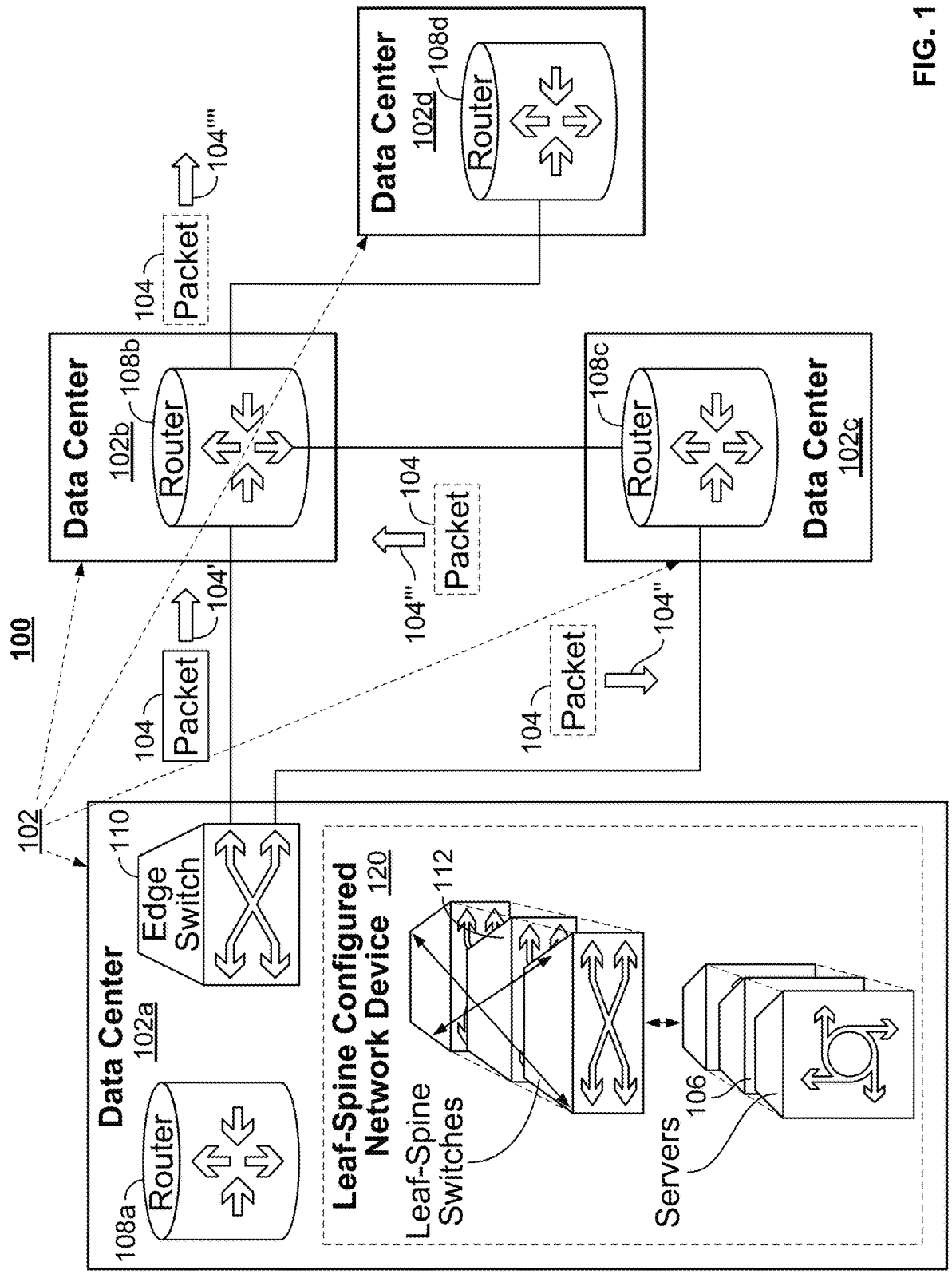
FIG. 1 shows a block diagram of a network, in accordance with some embodiments of the disclosure.

Load balancing techniques can and often do implement network multipath optimization where more than one path can lead network traffic to a common destination, but they tend to lack flexibility and adaptiveness. Take equal cost multi-path (ECMP) for example. ECMP is a multipath network routing technique that presumes two or more paths between nodes have the same routing cost. Accordingly, ECMP splits network traffic between the nodes evenly across the paths to avoid traffic congestion and to increase bandwidth. Should a link fail, traffic is redirected onto the remaining links with minimal interruption. But as the name might suggest, an ECMP network forwards traffic flow on a nondiscriminatory basis without regard to existing network conditions. Moreover, all paths are treated equally, as having equal bandwidth. Networking reality, however, paints a different picture, one that calls for keeping up with adaptive and dynamic network topology.

Some networks enjoy the benefit of biased path selection algorithms. An unequal cost multipath (UCMP)-based network may be thought of as an improvement to ECMP because it attempts to pay attention to individual paths and divides network traffic accordingly. ECMP and UCMP share a useful characteristic: they can both account for a dead path (a path with one or more failed or damaged network elements), but unlike its ECMP counterpart, UCMP has an added bandwidth awareness quality. Yet UCMP suffers from a drawback as well. UCMP does not support dynamic bandwidth determination. That is, a user is required to configure a static bandwidth for each network link, or each network neighbor. For example, in the following border gateway protocol UCMP example: "neighbor 11.0.3.2 link-bandwidth 40G (Gigabits-per-second (Gbps))", UCMP assumes that the network path between a source site and the destination site, identified by "11.0.3.2", is fixed at a bandwidth of 40 Gbps. Whereas, in practical applications, the bandwidth may degrade due to congestion or there may be a smaller pipe available between the two sites causing the bandwidth to reduce to 10 Gbps, an example bottleneck bandwidth scenario. UCMP lacks the capability to detect any of the foregoing bandwidth degradation and bottleneck issues.

In accordance with some embodiments and methods disclosed herein, a flexible and dynamic load balancing technique is implemented to assess real-time network conditions of coexisting multipaths (e.g., in wide array networks (WANs)) and based on the assessment, ensure traffic flows to a suitable egress path in a multipath network configuration. The system receives (e.g., periodically or continually) real-time network telemetric data representing real-time traffic telemetric characteristics of each network path of coexisting multipaths. Flows are distributed across the network paths based on the network telemetric data to avoid network congestion and optimize network performance. For example, latency and jitter-related performance degradation may be avoided or, at least, lessened. Similarly, bandwidth bottlenecks are avoided or, at least, lessened.

In addition to improving system performance, network path optimization can prove to be an effective cost-conscious measure. For example, reducing workload of a network element tends to improve network element longevity.

In response to receiving the network telemetric data, the system determines whether a network path should be selected for a network flow, or not, and in response to determining the network path should be selected for a network flow, a network flow corresponding to the selected network path is forwarded onto the network. The network flow, for example, may be forwarded onto an egress network path to a destination network element. In some embodiments, the system is a layer 3 network element, for example, a network router.

The system attempts to utilize most or nearly all, if not all, available network path bandwidth at any given time. Preferably, load balancing is performed dynamically based on real-time or near real-time network telemetry measurements by tracking changing network telemetric characteristics. Accordingly, a hashed flow need not maintain fixed routing and can instead benefit from hashed flows reflecting changing network conditions. The disclosed load balancing is therefore adaptive. Various adaptive load balancing processes exhibit reliable and efficient network characteristics and avoid path saturation or bottlenecks due to path bandwidth constraints, for example.

In an example scenario, to appreciate the distinctive outcomes of some embodiments and methods relative to existing multipath load balancing techniques, a 10 Gigabits-per-second (Gbps) network link is presumed to carry a network path, Path A, with network traffic of equal bandwidth, 10 Gbps. Path A is essentially at capacity. Flow A has a 1 Gbps bandwidth and is hashed or due to be hashed with Path A. In a static-based packet selection network, for example, ECMP or UCMP, if Flow A is hashed with Path A, Path A will saturate because it simply lacks the available bandwidth to take on Flow A and Flow A will likely be dropped. An ECMP or UCMP path selector has no knowledge of Path A conditions. In a disclosed dynamic load balancing method and embodiment, on the other hand, Flow A would not be hashed with Path A. Path A will continue to carry the 10 Gbit network traffic but Path A will not be selected for hashing with Flow A because a router executing disclosed dynamic load balancing processes would have insight into the condition of Path A, and, given this a priori knowledge of Path A conditions, the router will know to select a path other than Path A suitable to carry Flow A network packets reliably. Flow A network packets are steered away from Path A and therefore avoid potential drop risks.

Network telemetric data is monitored in realtime and in accordance with various monitoring techniques. In some embodiments, network telemetric data is measured in accordance with the techniques and embodiments disclosed in U.S. Provisional Application No. 62/925,193, filed on Oct. 23, 2019, and titled "TCP Performance Model Based In-Band Network Telemetry" (the "'193 Provisional application"), hereby incorporated as though set forth in full herein. It is understood that other monitoring methods, techniques, and embodiments may be utilized.

In some embodiments, active paths are used for path selection. A path may be considered active in response to a sender receiving feedback after sending packet data to a receiver. Paths may become inactive in response to a sender not receiving the feedback after a predefined period or after a predefined keepalives.

In some embodiments, telemetry data is continually measured and monitored based on network path characteristics such as, without limitation, network path latency, network path jitter, network path packet loss, and/or a combination thereof. In the case of wireless networks conforming with WiFi protocols, signal strength may be added to the list of monitored metrics. Queue depth is yet another possibly useful network health metric. It is understood that other measured characteristics may be employed as metrics.

Exemplary adaptive load balancing algorithms incorporate at least some of the available path condition indicators to choose the "best path" of packet travel. For example, increases to the rate of path latency due to increased path throughput are an indicator that the path may be nearing its bottleneck bandwidth (or nearing saturation). In this respect, various adaptive load balancing algorithms disclosed herein are predictive and provide the benefit of look-ahead, or a priori knowledge, in making decisions before a network path, and therefore network flows based on the network path, experience detrimental outcomes.

In some methods, an example network element determines whether the network path should be selected, or not, for forwarding a network flow based on the network path appearing on a list of "best paths." In some embodiments, the dynamic load balancing techniques, processes, and embodiments are flow-based. That is, each time a new flow is to be built, the "best path" may replace an existing path. The list of "best paths" is built from adequate or acceptable network paths, and subsequently, a network path to be selected for a network flow may be accessed or selected from the list of "best paths." In an embodiment, adequate or acceptable (or better than adequate and acceptable) network paths may be paths with telemetry characteristics tolerable by the path without compromising, or at least only minimally comprising, path integrity. For example, a 100 Mbps-path that has existing traffic of 99 Mbps bandwidth may not be considered adequate or acceptable for subsequent flows, particularly those of more than a 1 Mbps bandwidth. In an embodiment, a path with a higher than tolerable latency may not qualify as a "best path." For example, a path with a bottleneck extending from node to node may have exposure to packet dropping risks and not be considered a qualifying candidate for the "best path" list. It is understood that one or more other, or one or more additional, criteria can form the basis of a qualifying path for a "best paths" list. Accordingly, at any given time, the "best path" may include a single path.

A "best path" qualifier may rest on adequate or tolerable (or better than adequate or tolerable) network path characteristics. In an example method, network path telemetric data may be measured under an ideal or near ideal network condition with no network traffic to determine baseline telemetric data measurements that may serve as threshold values, threshold ranges of values, levels, or percentages to determine "best paths" during regular operation of a network element executing disclosed adaptive load balancing processes.

Pushing beyond the bottleneck bandwidth may cause network traffic to experience packet loss. In non-limiting examples, the adaptive characteristics of path selection engine embodiments cause the path selection engine to choose a path that has the smallest increase in latency. The engine may, therefore, learn of the bottleneck bandwidth condition of a network path on the fly and prevent network traffic from flowing onto the near-saturated network path. In this regard, disclosed embodiments and methods are predictive as previously discussed.

In another type of network element, such as a switch with wireless WAN interfaces (e.g., long-term evolution (LTE)), the path selection engine can incorporate indicators such as wireless signal strength and choose a network path based on the wireless signal strength. Continuing with the above example of a 100 Mbps path/link, assume the link is over an LTE wireless network. Further assume that because of inclement weather, the signal strength weakens, and the link can only carry 50 Mbps of network traffic; disclosed adaptive load balancing processes could cleverly detect the link bandwidth drop and remove the path from selection when 50 Mbps is reached.

In some embodiments, in a WAN, a network element receives real-time network telemetric data representing real-time traffic telemetry characteristics of each network path of coexisting multipaths. Each of the network paths of the coexisting multipaths may, for example, extend from a source network element to a destination network element and may have an associated network telemetric data. The network traffic is split across the network paths based on the network telemetric data to avoid network congestion and increase network optimization. The network element may perform an adaptive load balancing process by selecting a network path from the coexisting multipaths and, based on the network telemetric data, determine whether the network path should be selected for a network flow, or not. In response to determining the network path should be selected for a network flow, the network element may forward a network flow based on the selected network path onto the network, such as through an egress network path to the destination network element. In response to determining the network path should not be selected for a network flow, the network element may prevent a network flow based on the network path onto the egress network path. The network element performs the adaptive load balancing process repeatedly (or dynamically) for at least some of the network paths of the coexisting multipaths in order to continue network optimization.

In some methods, the determination as to whether a network path should be selected for a network flow or not is performed dynamically and/or adaptively. In some embodiments, network telemetric data is continually received and refreshed, for example, at periodic intervals (e.g., a particular). Network telemetry data may be received at a rate of once per second, for instance. Network telemetry data may be continually received and refreshed at aperiodic intervals. The rate at which network telemetry data is received and/or monitored may be based, at least in part, on network performance, network capabilities, and desired network outcomes.

In some embodiments, a path characteristics indicator represents a level, value, percentage or range of path congestion metrics and forms a basis for determining to select the network path, or not, for forwarding one or more network flows onto the network. In some embodiments, the path characteristics indicator is based on one or more path telemetry characteristics, such as jitter, latency, or packet loss or other or additional characteristics.

Determining whether a network path should be selected or not may be based at least in part on one, more than one, all, or a combination thereof of network telemetry data. For each of the network paths of coexisting multipaths, an available path bandwidth may be derived based on the path telemetry data. In an example embodiment, path bandwidth may be derived using processes and embodiments disclosed in the '193 Provisional Application, cited earlier herein. Based on the available bandwidth, the network element can determine, for each network path of the coexisting multipaths, whether a corresponding network path should be selected for forwarding a network flow or not. In response to determining the corresponding network path should be selected for forwarding a network flow, the network element forwards a network flow based on the corresponding network path onto the network, an egress network path to the destination network element, for example. In response to determining the corresponding network path should not be selected for forwarding onto a network flow, the network element prevents selection of the corresponding network path. Therefore, the network element does not select the corresponding network path for a network flow onto the egress network path.

In some path bundling embodiments, a control plane engine detects and bundles all network paths for a given route. In accordance with an example path telemetry measurement, a data plane continually measures telemetry path information such as latency, jitter and packet loss rate for all the network paths of a multipath bundle. Another thread in the data plane may continually evaluate data plane values and decide if a path should be allowed for selection onto a flow or not. In accordance with a path filtration process, this information may be refreshed at a given rate, for example, every second. The filtered paths are "best paths" for a corresponding route. The filtration or "best path" selection may be separate from the forwarding thread rendering an engine design implementing disclosed path selection processes at least as fast as forwarding engines by ECMP/UCMP networks. When the first packet of a flow arrives at the data plane, disclosed adaptive load balancing processing or path selector embodiments might assess available "best paths" and select a path in a round-robin fashion. In some embodiments, another type of selection may be employed. The adaptive load balancer may associate the selected path with a flow using a flow cache, for example. When subsequent packets in the same flow arrive, the flow cache is consulted to retrieve the selected path for flow forwarding.

In accordance with an example adaptive load balancing feature between paths of unequal bandwidth of a multipath bundle, an example load balancing process between 100 Mbps and 1 Gbps paths may be achieved using the above example. For example, available bandwidth (1.1 Gbps) utilization is maximized until the bottleneck bandwidth is reached, and the flows are assigned to both paths in a round-robin fashion. When 100 Mbps is near its capacity, naturally, path latency starts to climb, a noticeable change to a disclosed adaptive load balancer. The path latency or other types of telemetry characteristics may be metric measurement indicators. The network element may remove the 100 Mbps path from the list of available "best paths" for selection to avoid a possible flow based on the 100 Mbps path. All new flows hash onto the 1 Gbps path, and the network is bandwidth-maximized. In some embodiments, the 100 Mbps path is replaced with another network path in the list of "best paths" with a bandwidth that is at least greater than the nearly maximized bandwidth of the 100 Mbps. Accordingly, a network flow that would have been forwarded onto the 100 Mpbs path would be instead forwarded onto a path with a bandwidth sufficient to prevent the bottleneck. In some embodiments where no list of best paths may be employed, a network path may not be selected from a list of network paths and may instead be directly selected from an appropriately performing network path in accordance with corresponding and relative network telemetry characteristics.

FIG. 1 shows a block diagram of a network topology 100 implementing various disclosed adaptive load balancing systems and methods herein. In accordance with some embodiments, network topology 100 includes data centers 102 arranged in a networking configuration to facilitate implementation of various adaptive load balancing techniques disclosed herein. Network traffic flow through the network topology 100 is nearly free of congestion, therefore enabling network optimization realization.

With continued reference to FIG. 1, in operation, a data packet, such as a data packet 104, can travel through many combinations of a number of nodes and links prior to reaching its final destination. Disclosed dynamic path selection processes and techniques determine an optimized path to achieve load balance. For example, a data packet chartered to travel a congested path, one that is predicted with bandwidth bottleneck, is redirected to a path with no predicted bandwidth bottleneck.

In some embodiments, network topology 100 may include one or more embedded networks. For example, one or more of the data centers 102 may be a part of a distinct network. A non-limiting example of a distinct network is a wide array network (WAN) or cloud network. An example of a network topology with distinct networks is provided in FIG. 8.

For the purpose of illustration, data centers 102 are shown to include a total of four distinct data centers identified in FIG. 1 as data centers 102a-102d, although it is understood that any number of data centers may be employed. Any combination of one or more data centers of the data centers 102 may be and typically is physically remotely located relative to a remaining combination of the data centers 102. Nevertheless, data centers 102 are communicatively coupled to one another facilitating network traffic flow between one another through respective network elements. Data centers 102 are shown to include (network) routers 108. For example, each of data centers 102a-102d includes a respective one of routers 108*a*-108*d*. While a single router is shown in each data center in FIG. 1, it is understood that any number of routers (and/or other types of network elements) may be, and typically are, employed by each data center.

In some embodiments, network topology 100 includes an example of a leaf-spine network architecture, although it is understood that network topology 100 may include other suitable architectures and topologies. As is readily known, a leaf-spine network topology generally allows data flows to take shortcuts from a data source to a data destination in a network. Typically, data flows within a leaf-spine fabric take the same number of hops on the network regardless of the source and destination. For at least the foregoing reason, leaf-spine network fabrics are generally well suited for adaptive load balancing implementations. For the purpose of illustration, in the remaining discussion of FIG. 1, network topology 100 is presumed to include a leaf-spine network topology.

Data center 102*a* is further shown to include an edge switch 110, and a leaf-spine configured network device 120, in accordance with some embodiments. Leaf-spine configured network device 120 includes a leaf-spine switch array 112 and a server bank 106, communicatively coupled together. In some embodiments, either router 108*a* or edge switch 110 or a combination thereof may implement various dynamic load balancing techniques disclosed herein. In some embodiments, one or more network elements other than router 108*a* and edge switch 110 may implement various dynamic load balancing techniques disclosed herein.

In network topology 100, data packets may take different paths, based on traffic intensity, when traveling from a source to a destination. In the embodiment of FIG. 1, for example, the data (or "network") packet 104 enjoys the benefit of traveling optional flow paths from source data center 102*a*, for example, to destination data center 102*d*. Indeed, data packet 204 may travel through one or more data centers, data centers 102*b*, 102*c*, and networks, or one large extended network between data centers 102*a* and 102*d*, before reaching its destination. For the purpose of clarity of illustration, in FIG. 1, data packets en route from one data center to another data center (e.g., from data center 102*a* to data center 102*c*, from data center 102*c* to data center 102*b*, and from data center 102*b* to data center 102*d*), are shown with a dashed outline in place of a solid outline as shown for data packet 104 traveling from data center 102*a* to data center 102*b*. Optional paths are labeled with the data packet reference number "104" and a uniquely identifying prime notation. For example, traveling from data center 102*a* to data center 102*b*, packet 104 may take a path 104'; traveling from data center 102*a* to data center 102*c*, packet 104 may take a path 104"; traveling from data center 102*c* (after completing its travel through path 104") to data center 102*d*, packet 104 may take a path 104'''; and traveling from data center 102*a* to data center 102*d*, packet 104 may take path 104' (to data center 102*b*) followed by taking a path 104'''' from data center 102*b* to 102*d*.

Network paths 104' through 104'''' are examples of coexisting multipaths that are available for selection for data packet 104 travel throughout the network of network topology 100 by various adaptive load balancing processes disclosed herein. A path is selected based on path optimization to achieve load balancing. For example, data packet 104 may be chartered to travel a congested path: path 104', from data center 102*a* to reach data center 102*b*, and path 104' may be predicted with bandwidth bottleneck. But paths 104" and 104''' leading to the same destination, data center 102*b*, may be free of predicted bandwidth bottleneck; consequently, a network element implementing a dynamic load balancing process, such as router 108*a* or edge switch 110, may redirect data packet 104 to travel paths 104" and 104'''.

In accordance with an example adaptive load balancing technique, as implemented in network topology 100, data center 102*a* receives network telemetry data corresponding to all network paths 104' through 104''''. Namely, edge switch 110 determines whether a network path from the coexisting multipaths, listed above, is adequate for data packet 104 to travel to its intended destination based on the received network telemetry data. If an adequate network path is undetermined, edge switch 110 continues to test for an adequate path as further telemetry data is received for the same paths or perhaps additional paths until at least one adequate path is determined. Finding an adequate network path leads edge switch 110 to a network path selection for the next network flow carrying data packet 104 to its final destination.

Network topologies of various disclosure are not limited to the number of data packet paths shown in FIG. 1. In fact, in typical network scenarios, numerous paths, many more than those of the discussions presented herein, are optionally available to data packets. Similarly, typically more than one path is available between nodes internal to a data center. For example, a data packet may travel one of numerous available paths between server bank 106 and switch array 112 and/or within each of server bank 106 and switch array 112.

Data center 102*a* typically includes multiple routers or switches, as can the remaining data centers of FIG. 1. In a non-limiting example, server bank 106 includes more than one (network) server and more than one leaf-spine (network) switch, for example, a pair of leaf-spine switches and several leaf switches and multiple servers can service the various leaf and spine switches. Server bank 106 communicates with the leaf switches of the array 112, which in turn communicate with the spine switches of the array 112. Spine switches transmit data from leaf switches to the edge switch 110. It is understood that the configuration of network elements in data center 102*a* is but a non-limiting example of numerous possible arrangements. While not shown, data centers 102*b*-*c* may also include one or more routers, switches, servers, and other types of network elements. Further arrangements of routers and switches located inside or outside of data centers 102*a*-102*d* in FIG. 1 are readily devised.

In a non-limiting example, edge switch 110 routes packets to one or more of the remaining data centers, for example, data centers 102*b* or 102*c* along inter-data center links, and is responsible for detecting when a particular path from one data center, for example, data center 102*a*, to another data center, for example, data center 102*d*, e.g., from one node to another, is up or down (or "available" or not). An available link/path, or a link/path that is "up," may also be referred to as an "active" link herein.

In some embodiments, adaptive load balancing is performed at the transport layer (layer 3), from network element to network element, e.g., router-to-router. In accordance with adaptive (or "dynamic") load balancing techniques of network topology 100, all available network paths are continually monitored to broaden the search for a "best path" determination.

Performance characteristics of network paths carrying in-band data can prove vital to effective network path selection and traffic load balancing. Network telemetry data provides telemetry metrics of a given network path. In some embodiments, telemetry data includes, without limitation, jitter, latency, packet loss rate, and bandwidth availability measurements. In addition to jitter, latency, packet loss rate, and bandwidth availability measurements, path characteristic measurements can be based on the application being executed or traffic class. For example, path 104', in FIG. 1, may be experiencing the least packet loss rate with the highest bandwidth availability among remaining paths of network topology 100 and therefore best suited for a voice-over-internet-protocol (VoIP) application, while path 104''' may be selected based on the smallest jitter characteristic and therefore selected for a video streaming application execution.

In some embodiments, dynamic load balancing is performed on a flow basis with inputs to the load balancer being available paths. The paths are programmed from a control plane with inputs from routing protocols, interface states and other known network path programming mechanisms. In some embodiments, dynamic load balancing is based, at least in part, on packet class, using an access control list (ACL), deep packet inspection (DPI) or other suitable classification mechanism. In some embodiments, various dynamic path selection techniques disclosed herein may be implemented by other suitable path telemetry measurement systems, techniques and software.

In some embodiments, a header-encapsulated network packet carries network path metrics for path characterization and in some cases, class priority. For example, packet sequence numbers may be embedded in a header packet, the header of data packet 104 (FIG. 1), encapsulating a corresponding original packet (which may itself have an associated header), for computing packet loss. An acknowledgment packet time stamp, in the header packet that encapsulates the original network packet, can be compared to a current time stamp to compute round-trip time (RTT). In an embodiment, bandwidth availability prediction can be calculated based on packet loss rate and RTT. A non-limiting example of an encapsulation routing technique is multiprotocol label switching (MPLS).

In various methods, in-band TCP network path bandwidth availability estimation is determined at the (layer 3) network layer, for example, router-to-router, using TCP performance characteristic modeling. A TCP performance model algorithm, such as the one disclosed in "The Macroscopic Behavior of the TCP Congestion Avoidance Algorithm," by Matthew Mathis, et al., published in July, 1997, and found at http://ccr.sigcomm.org/archive/1997/jul97/ccr-9707-mathis.pdf, may be implemented to determine network path bandwidth availability for load balancing. Bandwidth availability estimation can avoid otherwise performance-degrading bandwidth bottlenecks, optimize load balancing, and improve customer application execution efficiency. As previously discussed, dynamic load balancing is based, at least in part, on dynamic path selection, which entails selecting a path between two or more distinct types of network paths (e.g., multi protocol label switching (MPLS) subnet and internet service provider (ISP) subnet, in a WAN-to-WAN network configuration, or a public cloud topology) based on the best telemetrically qualified path at a particular node, for example, at a layer 3 network router.

Figure 2A:
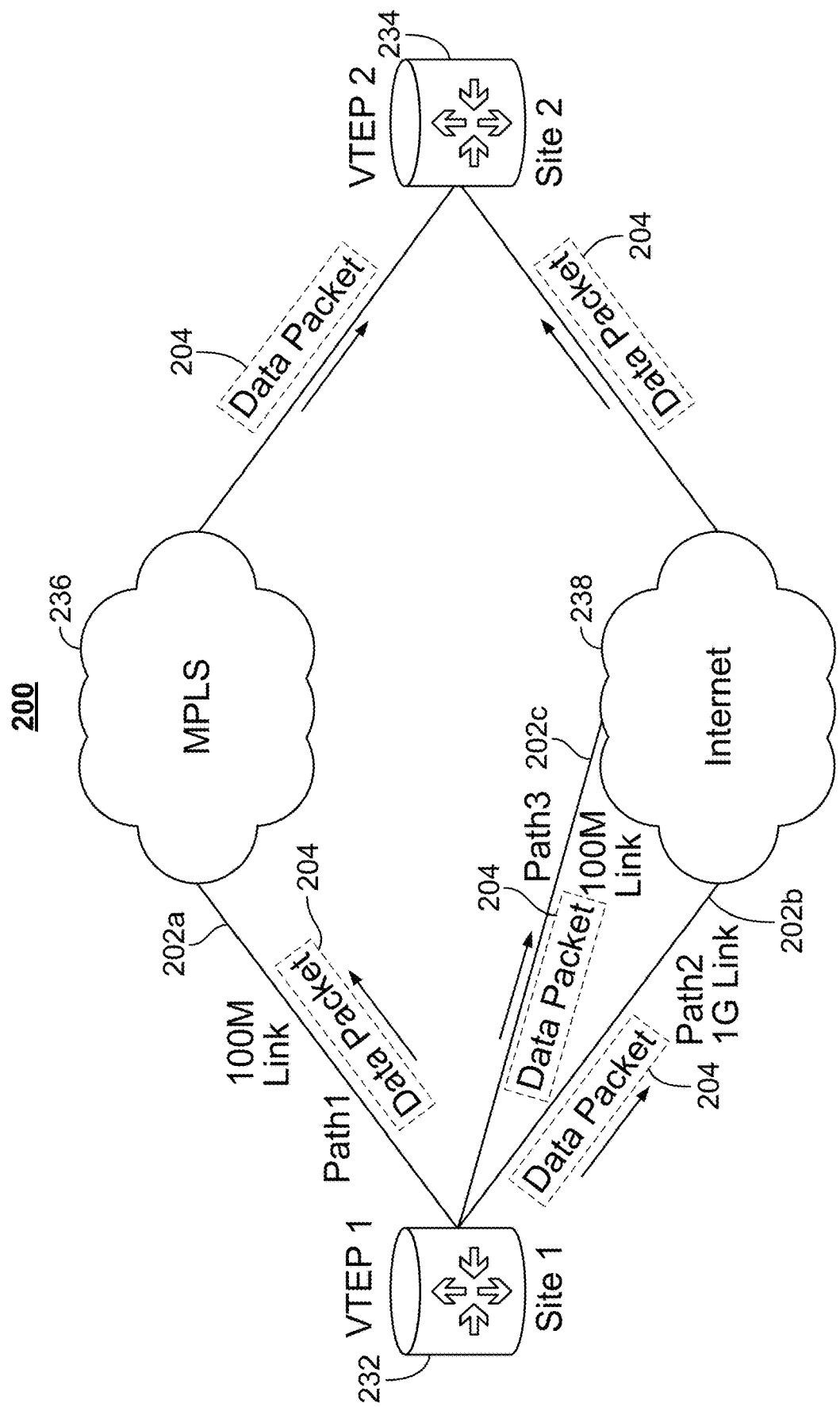
FIG. 2A shows an example network system, in accordance with some embodiments of the disclosure.

FIG. 2A shows an example network system, in accordance with some embodiments of the disclosure. FIG. 2A shows an example network system configured as a network system 200, in accordance with some embodiments of the disclosure. In FIG. 2A, Site 1 and Site 2 are communicatively network-coupled through an MPLS network 236 and an internet network 238. As may be referred to herein, MPLS network 236 and internet network 238 may each be subnets, for example, MPLS subnet 236 and internet subnet 238, respectively. Site 1 includes a network element 232 and Site 2 includes a network element 234. It is understood that while not shown, each of Sites 1 and 2 typically include additional network elements generally communicatively coupled through network links.

In some embodiments, Sites 1 and 2 are remotely located from one another. For example, Site 1 may be the headquarters site of Bank AB, while Site 2 may be an office branch site of Bank AB. Each of network elements 232 and 234 may be a router in some embodiments. In the network environment of FIG. 2A, network element 232 serves as a WAN network router virtual tunnel endpoint (VTEP), namely, VTEP 1, and network element 234 serves as a VTEP, namely VTEP 2.

In typical applications and without limitation, MPLS network 236 may be employed for voice traffic, and internet network 238 may be employed for data traffic; therefore, MPLS network egress and ingress paths may be given a higher priority than those of internet network 238. For example, network data packets corresponding to Bank AB public website updates may be transmitted from Site 1 to Site 2, or vice versa. For the purpose of simplicity, packets will be presumed to travel from Site 1 to Site 2. Various network traffic may flow through network 236 or network 238, but traffic flow from network 232 to network element 238 is consummated through paths 2 and 3, or paths 202b and 202c, whereas network flow from network 232 to network element 236 is consummated through path 1, or path 202a. In this respect, a data packet 204 may travel through network paths 1, 2, or 3 when traveling from Site 1 to Site 2 (and vice versa). Network element 232, at Site 1, monitors telemetry characteristics of paths 202 (202a, 202b, 202c) (also referred to herein as "links"). It is understood that three paths is a non-limiting number of paths and merely a presumptive feature example of system 200.

In the example of FIG. 2A, network element 232 implements dynamic load balancing of some embodiments of the disclosure. Path 202a is presumed having a 100-megabits-per-second (1M) bandwidth, path 202b is presumed having a 1-giga-bit-per-second (1G) bandwidth and path 202c is presumed having a 1M bandwidth. In a scenario with bandwidth as the sole telemetry metric or a scenario with bandwidth serving as the prominent telemetry metric, clearly, network element 232 is most likely to select path 202b for data packet 204 travel from Site 1 to Site 2 because of the noticeably relatively larger bandwidth over paths 202a and 202c, for example. In accordance with various disclosed methods, network element 232 may determine a new path, path 202c, for data packet 204 travel from Site 1 to network 238 based on bandwidth telemetry measurements of paths 202 at a given time. In some embodiments, as shown and discussed relative to FIGS. 2B-2F, telemetry characteristics other than bandwidth may form the basis for path selection, i.e., the travel fate of data packet 204 from Site 1 to Site 2.

Figure 2B:
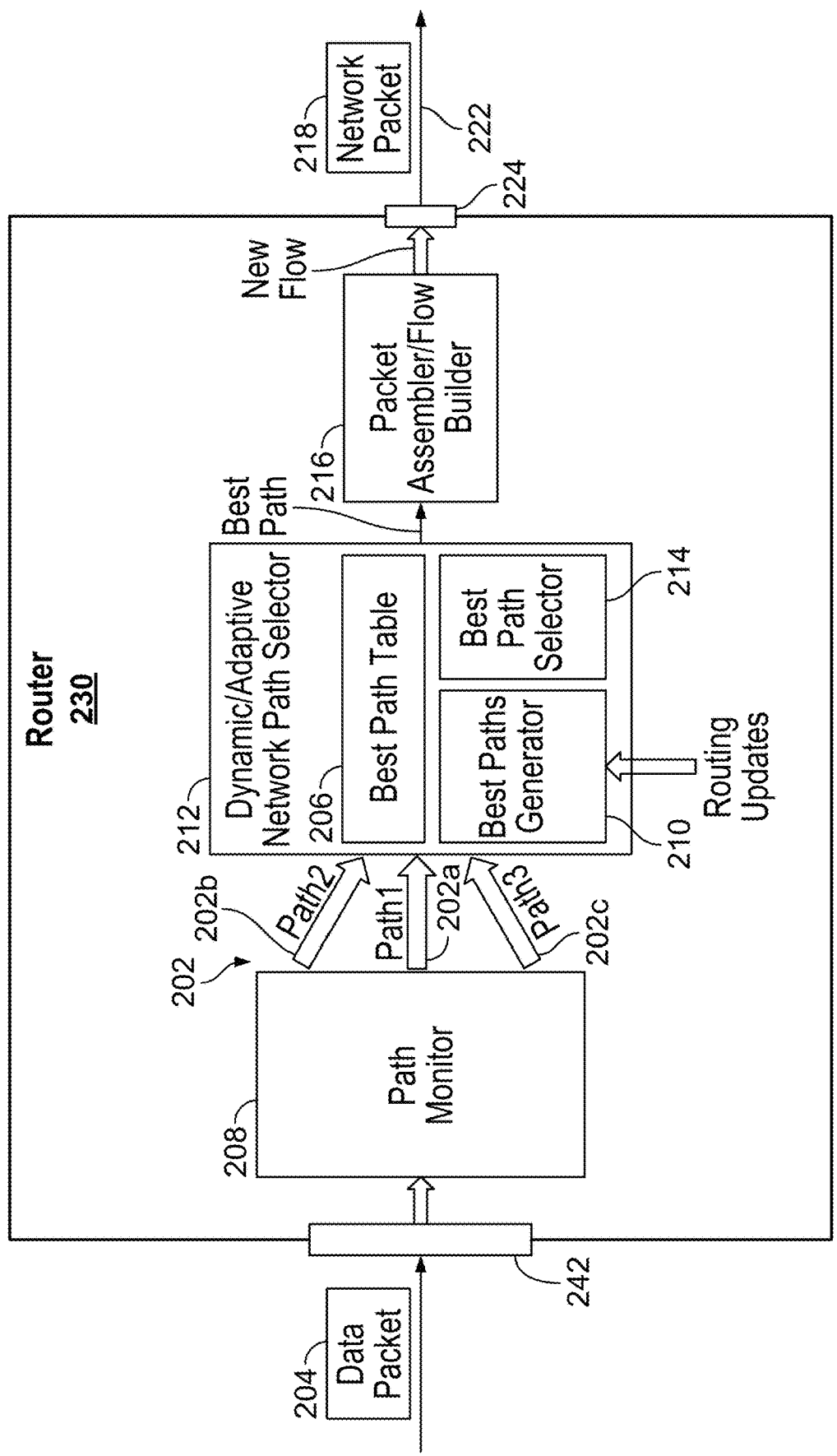
FIG. 2B shows a block diagram of a router, in accordance with some embodiments of the disclosure.

FIG. 2B shows a block diagram of a network element, in accordance with various disclosures. FIG. 2B shows a block diagram of a network element 230, in accordance with some embodiments. In various embodiments, network element 230 may be implemented as a router and located in one or more of the data centers 102 (FIG. 1) and/or system 200 (FIG. 2A). Alternatively, router 230 may replace or may be incorporated in edge switch 110 (FIG. 1).

In a non-limiting example, in FIG. 2B, network element 230 is presumed to be configured as a router implemented at Site 1 of FIG. 2A, namely as the VTEP 1 router 232. Router 230 includes systems and carries out processes to implement adaptive load balancing techniques of various embodiments herein. In some embodiments, router 230 may be implemented in hardware, software, or a combination of the two. For example, one or more processors executing adaptive load balancing program instructions may implement router 230.

Router 230 is shown to include a path monitor 208, a dynamic (or adaptive) network path selector 212, a packet assembler (or "packet flow builder") 216, an ingress interface 242 and an egress interface 224, in accordance with various disclosures. The components, or parts thereof, in router 230 can be implemented, in part or in whole, using hardware, firmware, software executing on a processor, or combinations thereof. In some embodiments, program instructions are executed by a processor to implement the functions and techniques of network path selector 212 and/or packet assembler 216. For example, a central processing unit (CPU), such as a CPU 704 (FIG. 7) may execute program instructions from a memory 706 (FIG. 7) configured to store program instructions and/or data corresponding to various activities performed by the components of router 230. For example, memory 706 may store the program instructions executed by processor 704 and/or disclosed network telemetry data or variations thereof. In some embodiments, memory 706 may store initial conditions and/or default information to assist with a known condition state of router 230 upon start-up. It is understood that memory 706 may be employed for storing any information suitable for carrying out the various adaptive load balancing techniques of the disclosure.

Referring now to FIG. 2B, path monitor 208, individually or collectively with packet assembler 216, may generally comprise a path telemetry and shaping (PTS) engine, such as a transmission control protocol (TCP)-compliant PTS engine, an example of which is PTS engine 312 shown and discussed in earlier-referenced U.S. Provisional Application No. 62/925,193. In an embodiment, packet assembler 216 may be a part of a policy-based routing (PBR) engine, such as PBR engine 316 in U.S. Provisional Application No. 62/925,193. Path monitor 208 continuously, in realtime, and at a rate (or by polling) monitors network telemetry information of network paths, such as network paths 202, and correspondingly records path characteristics of the monitored network paths. In some embodiments, path monitor 208 performs continuous and real-time path monitoring, as disclosed in U.S. Provisional Application No. 62/925,193.

In the example of FIG. 2B, path monitor 208 monitors telemetry information of paths 202, i.e., paths 202a-202c. In some embodiments, network path selector 212 includes a best paths generator 210, a best path selector 214, and a best path table 206. Network path selector 212 is configured to perform various processes and steps to adaptively select an adequate path or "best path" for data packet 204, and flow builder 216 constructs a network flow based on the selected path from dynamic network path selector 212. In some embodiments, dynamic network path selector 212, with the aid of flow builder 216, and one or more of the remaining components of router 230 of FIG. 2, carries out the steps of the flow chart FIGS. 3-5. Interfaces 242 and 224 are each network interface devices transmitting and/or receiving data packets, such as data packet 204, for forwarding to or from router 230 from onto network elements externally located to the router 230. In the particular router implementation of FIG. 2B, interface 242 serves as an ingress interface and interface 224 serves as an egress interface.

In operation, router 230 receives packets from coexisting multipaths. For example, router 230 may receive packet 204 at ingress interface 242. Path monitor 208 continuously builds a useful treasure trove of telemetry information of network paths 202. Accordingly, the health, traffic congestion, bandwidth and other characteristics of paths 202 are monitored and known to path monitor 208 in real time. In some embodiments, path monitor 208 measures telemetry characteristics of paths 202 periodically, at predetermined time intervals. In some embodiments, path monitor 208 measures telemetry characteristics of paths 202 a periodically, at irregular intervals, or sporadically.

Dynamic network path selector 212 may receive telemetry data when the data is made available by path monitor 208 or at periodically, a periodically, or sporadically. As earlier noted, path monitor 208 may measure path telemetry characteristics at a particular intervals, periodically or a periodically. Rates at which path selector 212 measures and provides telemetry information may be synchronous or asynchronous relative to each other. Similarly, the rate at which path selector 212 measures or provides telemetry information may be synchronous or asynchronous relative to the rate at which path selector 212 receives (or samples) telemetry information. For example, path monitor 208 may take telemetry measurements every so many milliseconds, whereas path selector 212 may sample the telemetry measurements from path monitor 208 every so many seconds. In some embodiments, a higher telemetry measurement sampling rate translates to better load balancing and system optimization. In some embodiments, path monitor 208 may poll for telemetry information, and similarly, path selector 212 may poll path monitor 208 for telemetry information. Other suitable manners for receiving and measure telemetry information are anticipated. Based on the telemetry information from path monitor 208, dynamic network path selector 212 selects a best-suited path for data packet 204 to travel to its intended destination.

Best paths generator 210 receives monitored path characteristics of paths 202 and selects the best paths among paths 202 based on telemetry factors of interest. For example, best paths generator 210 may select best paths based on network flow bandwidth conditions or other characteristics, or a combination. Best paths generator 210 receives routing information periodically or sporadically and updates a routing table with particular network destinations associated with the routes of the routing table.

Figure 4:
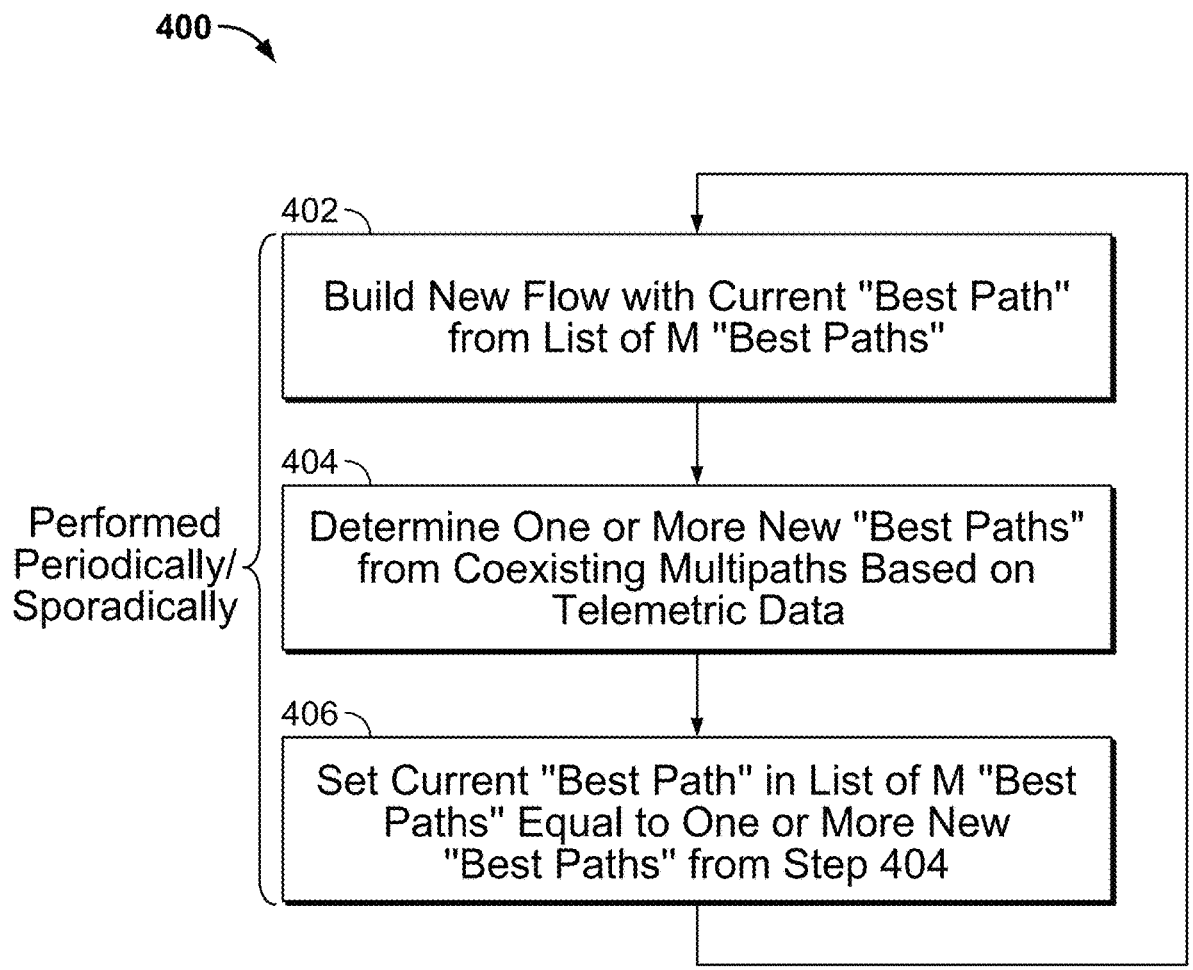
FIG. 4 shows a flow chart of a "best path" determination process, in accordance with some embodiments of the disclosure.

Best path selector 214 receives the best paths selected by best paths generator 210 and selects the best path among the received paths. In some embodiments, best path selector 214 implements a best path determination in accordance with a process 400 (FIG. 4). Best path table 206 is storage or memory for maintaining a list of the best paths selected by best paths generator 210. In some embodiments, best path selector 214 selects the best path from the list of best paths in table 206, for example, the best path among "M" number of best paths, "M" representing an integer value. In some embodiments, table 206 may be incorporated in or a part of best paths generator 210 or best path selector 214. In some embodiments, best path selector 214 is incorporated in or a part of best paths generator 210.

Packet 204 has a destination internet protocol (IP) address and may have a service classification field in a header of the packet based on a corresponding application that is executing on the network through which data packet 204 travels. In some embodiments, path selection by path selector 212 is implemented using forwarding information. Path selector 212 receives an extracted destination IP address from the header of packet 204, matches the destination IP address to the contents of a routing table, and based on the contents of the routing table, replaces the contents of the routing table relevant to the IP addresses of the current path assigned to data packet 204 with a path that is selected in accordance with disclosed dynamic path selection methods. The selected path indicates the next path to which the packet should be routed from egress interface 224. The routing table and routing table search may be implemented with any suitable technique and structure. Some embodiments use a lookup table, in which an object name as an output of the routing table is searched to provide an IP address or other identifier of the next path. In some embodiments, the routing table is a part of the path selector 212. In some embodiments, the routing table is saved in best path selector 214 or implemented in other components of router 230 located externally to path selector 212 or located externally to router 230.

Path selector 212 matches the routing table output with a service classifier, and if a match is determined, path selector 212 outputs a selected path as a result of the match. Flow builder 216 generates a packet header with a destination IP address reflecting the new data path (data path 222) and encapsulates the original data packet 204 header with the new header to generate the network packet 218. Network packet 218 is re-routed to a new path 222 in accordance with path telemetry characterizations best suited for packet 204. At a receiving end, the header encapsulating data packet 204 is stripped to expose various relevant packet information. Accordingly, the original path of data packet 204, path 202a, is interrupted and replaced with path 222 for system performance optimization. Given the real-time telemetry information available from path monitor 208, path selector 212, in conjunction with flow builder 216, optimizes system performance by continuously reconfiguring data flow paths. For example, in anticipation of a currently designated path for carrying data packet 204—path 202a—that may be nearing or actually meeting its maximum throughput (200M bandwidth), path selector 212 and flow builder 216 may re-route data packet 204 on a path with higher throughput—path 202b (with a 1G bandwidth)—and avoid risking potential packet drops at path 202a. It should be appreciated that in some scenarios, dynamic path selection may result in the selection of the same path, path 202a, based on the path 202a characteristics.

PBR policies may allow for specifying the next data packet network hop for the next hop groups for selected network traffic. When the next hop groups are specified in a PBR policy, in some embodiments, router 230 load balances using ECMP.

In some embodiments, dynamic load balancing is performed on a flow basis and may be more easily implemented in a software-based router where a large number of flows can be tracked by path monitor 208. In some embodiments, the dynamic load balancing algorithm is based on available telemetry data from path monitor 208 including bandwidth, latency, jitter, and packet loss rate on the path.

In some embodiments, a path is selected based on a load balancing policy for the selected traffic, and the IP addresses corresponding to the selected path are used in the outer IP header instead of, for example, the VTEP address, which is not routable in service provider networks.

Different types of load balancing policies may be applied for determining the best path. For example, with reference to FIG. 2B, path selector 212 may specify path preference for a traffic class of service based on the network type and path characteristics. In some cases, path selection is based on path characterization in addition to the class of traffic. In a non-limiting embodiment, voice traffic exemplifies critical (or high priority) traffic. Given its critical classification, the least latency-fraught path may be selected for voice traffic, whereas, for video streaming traffic, such as from YouTube, noncritical traffic, latency may be a characteristic of less comparative significance and a jitter-minimized path may be a more suitable option.

In some embodiments, an outgoing path (or path selection) is determined based on the type of network traffic (e.g., voice versus data), the path priority, and path characteristics.

In some embodiments, path selection is made on a path group (two or more paths) basis rather than on an individual path basis. For example, paths 202 may be selected as the best path group for carrying various data packets on to their intended destinations. Flow based forwarding may be implemented where a lookup decision is based on the first packet of a flow and the lookup decision is stored in a flow cache.

Dynamic load balancing is an effective way of controlling traffic congestion. In some embodiments, congestion control for different classes of traffic is different. For example, voice traffic of up to a certain bandwidth may not be subject to congestion control. In some embodiments, congestion control is at least in part based on the priority of network traffic. For example, voice traffic may be given a higher priority than data traffic in WAN and therefore not subjected to congestion control.

As previously noted, bandwidth saturation is not an exclusive path characteristics limitation. Telemetry characteristics such as latency, jitter, and packet loss serve as non-limiting further examples. FIGS. 2C-2F present example tables of path telemetry characteristics for paths 202 of FIGS. 2A and 2B. More specifically, each of the tables in FIGS. 2C-2F includes path telemetry characteristics latency, jitter, and packet loss. For each of the scenarios presented in FIGS. 2C-2F, the maximum (tolerable) path latency is presumed 50 milliseconds, the maximum (tolerable) path jitter is presumed 20 milliseconds and the maximum (tolerable) path packet loss is presumed 0%. Further presumed, path 202a of MPLS network is the highest priority path, followed by the remaining 202 paths. Each of the FIGS. 2C-2F represents telemetry information for a distinct network environment scenario. In an example scenario, path monitor 208 (FIG. 2B) is configured to measure the telemetry metric shown in the FIGS. 2C-2F tables at distinct times. For each figure scenario, best paths generator 210 selects at least one best path based on the best paths from best paths generator 210. The best path selections in FIGS. 2C-2F are based on telemetry metrics latency, jitter, and loss, without regard to bandwidth.

Each table of FIGS. 2C-2F includes four columns: a path identification column ("PathId"), a latency column, a jitter column, and a (packet) loss column. In the table of FIG. 2C, for example, path monitor 208 measures latency of path 1 (or path 202a) as 11 milliseconds, jitter as 10 milliseconds, packet loss of path 1 as 0. Path 2 (path 202b) latency, jitter, and loss are 40 milli seconds, 9 milli seconds, and 0, respectively. Path 3 (path 202c) latency, jitter, and loss are 30 milli seconds, 15 milli seconds, and 0, respectively. In the scenario of FIG. 2C, despite exhibiting relatively sub-optimal jitter characteristics (10 milli seconds versus 9 milli seconds and 15 milli seconds), path 1 is selected by best paths generator 210 as the best path because path 1 is experiencing the least latency relative to paths 2 and 3 by a wide margin (11 milli seconds versus 30 and 40 milli seconds). Given the wide differing latency characteristics between the three paths and the higher priority assigned to path 1, no other best path is selected.

In contrast, in the scenario of FIG. 2D, best paths generator 210 selects path 2 (path 202b) and path 3 (path 202c) as the best paths based on user-specified requirements for best paths, which in the example of FIGS. 2C-2F, is a latency equal or less than 50 milli seconds, jitter of up to 20 milli seconds, and loss of 0%. Accordingly, despite the relatively lower priority assigned to paths 2 and 3, because path 1 latency is intolerable (it exceeds the maximum tolerable latency (50 milli seconds) by 10 milli seconds), paths 2 and 3 are selected as the best path candidates. In some embodiments, best path selector 214 selects a single best path from the two candidate best paths, paths 2 and 3, on a round robin basis. Best path selector 214 may additionally or alternatively select a path between the best paths of FIGS. 2C, 2E, and 2F on a round robin basis.

Referring now to FIG. 2E, the latency of path 1 (51 milli seconds) exceeds the tolerable latency threshold (50 milli seconds) and the packet loss experienced by path 3 (0.01%) exceeds the 0% packet loss tolerance threshold. Accordingly, paths 1 and 3 are not selected as the best path; best paths generator selects path 2 as the best path. In FIG. 2F, the latency (55 milli seconds) and loss (0.02%) both exceed their respective maximum thresholds; accordingly, path 1 is not selected as the best path. Similarly, the latency (65 milli seconds) and loss (0.10%) of path 3 exceed their respective maximum thresholds, and path 3 is therefore not selected as a best path. In the scenario of FIG. 2F, indeed all paths exhibit at least one characteristic exceeding a respective maximum threshold. Path 2 experiences an intolerable packet loss (0.01) as well. Nevertheless, best paths generator 210 needs to select a path for a new flow for data packet 204; otherwise, data packet 204 cannot resume, or is delayed in resuming, travel to its intended destination, Site 2 (FIG. 2A). Path 2 experiences the least packet loss of all three packets and exhibits tolerable latency and jitter characteristics. Accordingly, path 2 is selected as the best path in the scenario of FIG. 2F.

In some embodiments, in addition to prioritizing based on traffic type, the path characteristics in each of the scenarios presented in FIGS. 2C-2F may be prioritized. For example, packet loss may be given a higher priority than jitter or latency. Path characteristics priority ratings may be a factor in determining the best path(s). In some embodiments, best paths generator 210 stores the best paths of each of the FIGS. 2C-2F in best path table 206 and best path selector 214 accesses the best paths from best path table 206, for a round robin best path determination.

Figure 3:
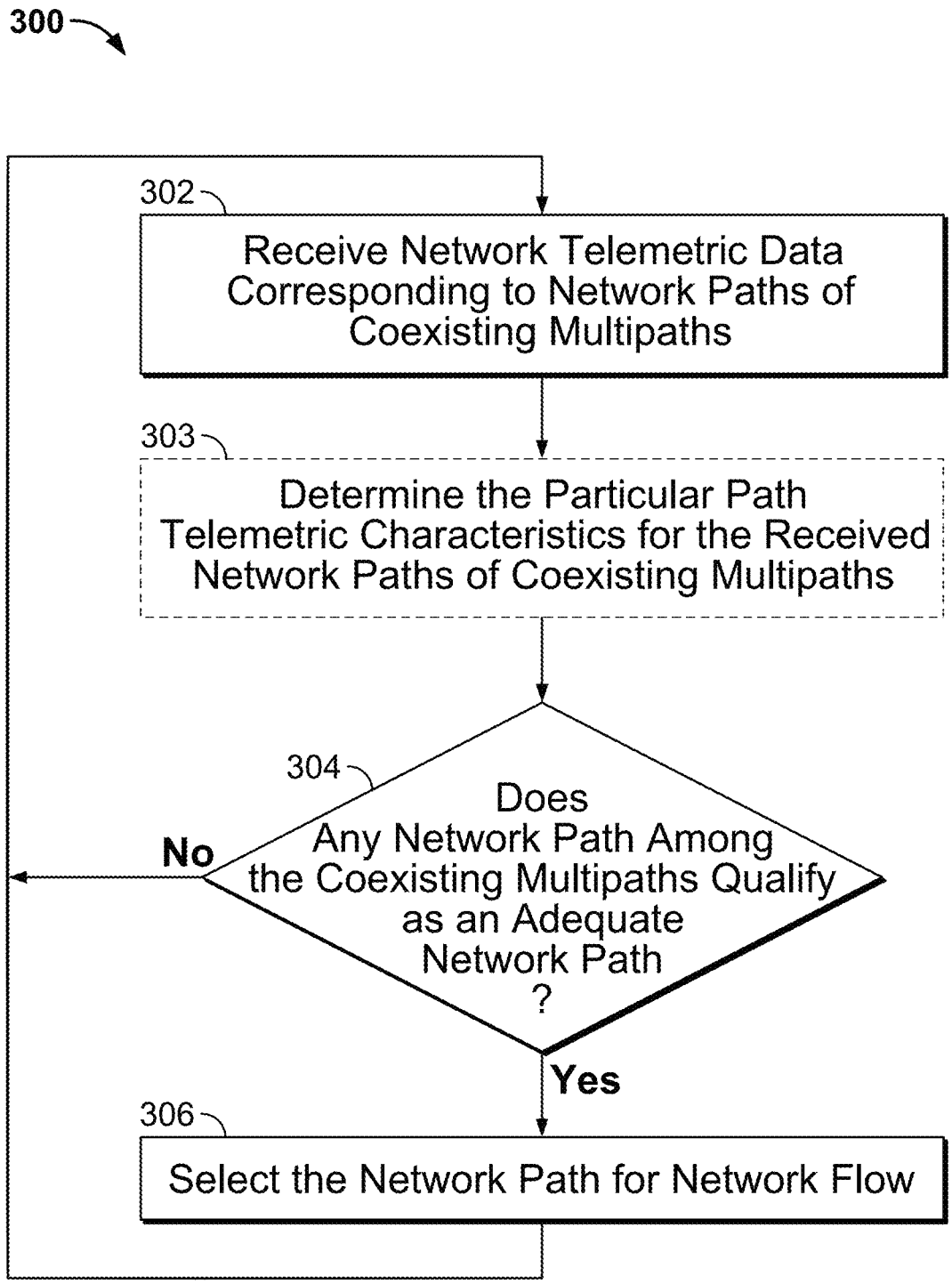
FIG. 3 shows a flow chart of a dynamic load balancing process, in accordance with some embodiments of the disclosure.

FIG. 3 shows a flow chart of a dynamic load balancing process, in accordance with disclosed methods. In an exemplary method, in a dynamic load balancing process 300, at step 302, network telemetry data corresponding to network paths of coexisting multipaths is received. Next, optionally, step 303 is performed. In some embodiments, process 300 skips step 303 and continues to step 304. At step 303, certain network path characteristics among the set of network characteristics received at step 302 for assessing an adequate or best path may be determined. In some embodiments, not all monitored network telemetry data may be necessary or provide the best estimate for choosing an appropriate path. For example, in a traffic-prone network environment, bandwidth is likely a vital metric for ascertaining an adequate or best path. Next, at step 304, a determination is made as to whether any network path among the coexisting multipaths of step 302 or step 303 (if step 303 is performed) qualifies as an adequate network path or a best network path based on the received network telemetry data from step 302 or the selected characteristics at step 303, as the case may be. In an embodiment, path selector 212 (FIG. 2B) performs steps 303 and 304. At step 306 of process 300, the network path that is determined to be adequate at step 304 is selected for the network flow. In an embodiment, flow builder 216 (FIG. 2B) performs step 306.

FIG. 4 shows a flow chart of a "best path" determination process, in accordance with disclosed methods. The flow chart of FIG. 4 shows a "best path" determination process 400, in accordance with methods of the disclosure. In an embodiment, the steps of process 400 are implemented by router 230, namely by path selector 212 and packet assembler 216 (FIG. 2B). At step 402, packet assembler 216 builds a new flow based on the new (or most recent) best path among coexisting multipaths provided by best path selector 214 based on real-time path telemetry data. For example, packet assembler 216 may build a new flow using path 1, in the scenario of FIG. 2C. The best path may be from a list of M best paths in best path table 206 (FIG. 2B) telemetry data. In some embodiments, path selection may be determined based on traffic class or type of network in addition to or in place of telemetry data. As path monitor 208 continues to monitor the coexisting paths, for example, paths 202, at step 404, path monitor 208 may determine one or more new best paths based on current telemetry data. Accordingly, at step 406, the current best path (of step 402) is replaced with the one or more best paths identified at step 404, and the process resumes to build yet another new flow based on the identified one or more best paths of step 404, starting from step 402.

In some embodiments where more than one path qualifies as a new path, the selection process between the multiple new paths may be performed in accordance with various path selection methods. For example, in scenarios with more than one path qualifying as the "best path" at a given time, flows may be assigned paths in a round robin fashion, as exemplified by the following scenario with two new paths qualifying as the "best path." Assuming path 1 and path 2 each qualify as a "best path," Flow A is assigned path 1, and the next flow, Flow B, is assigned path 2; the flow following Flow B, that is Flow C is assigned path 1; the flow following Flow C, that is Flow D, is assigned path 2; and the path assignment of the next flow will go back to path 1, and so forth. Accordingly, the assignment of paths to sequentially arranged flows alternates between path 1 and path 2. Round robin is one of various other schemes for selecting a path from multiple best paths.

Figure 5:
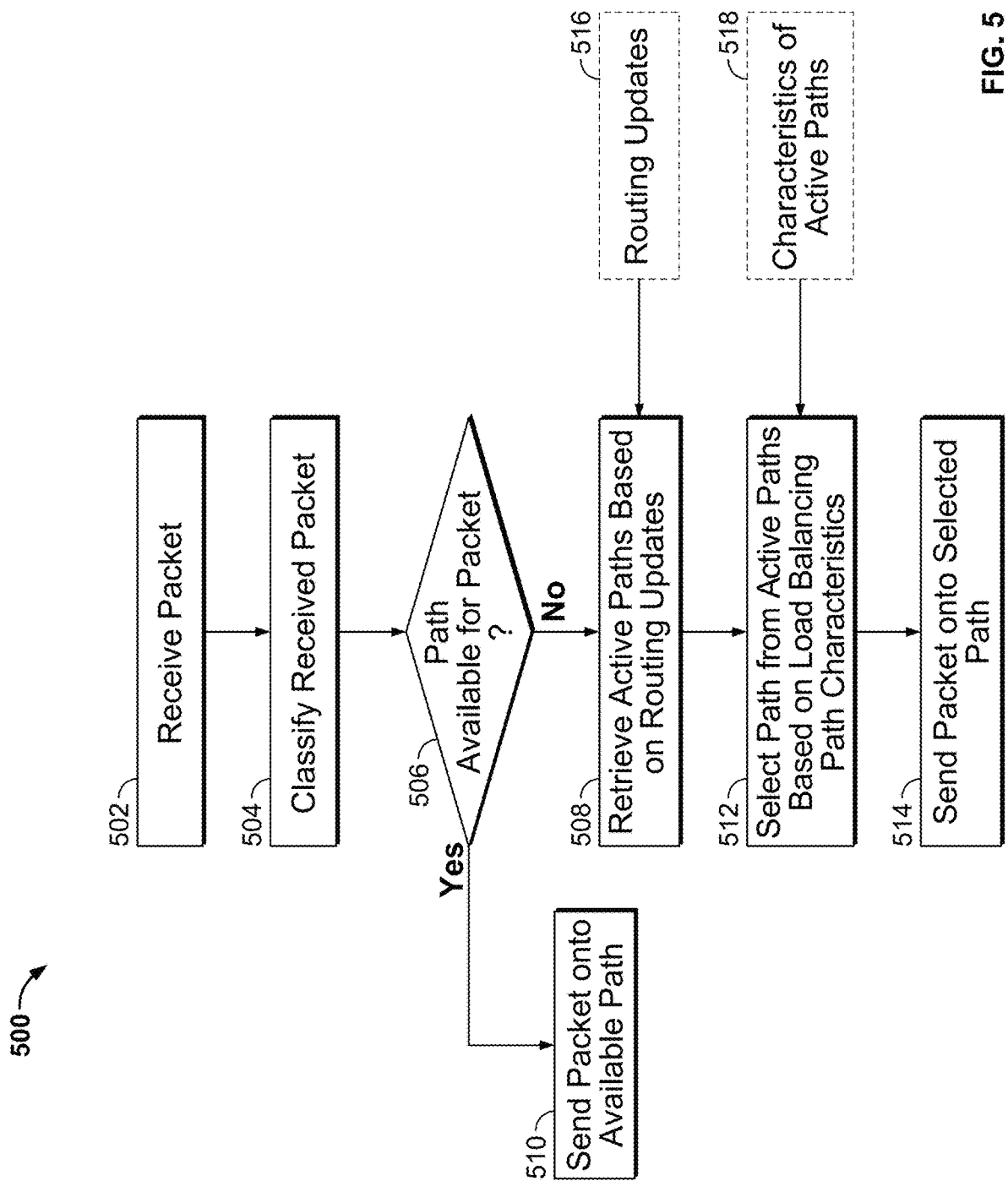
FIG. 5 shows a dynamic load balancing process, in accordance with some embodiments of the disclosure.

FIG. 5 shows a flow chart of a dynamic load balancing process, in accordance with methods of the disclosure. The flow chart of FIG. 5 shows a dynamic load balancing process 500, in accordance with disclosed methods. In an example embodiment, process 500 is carried out by router 230 (FIG. 2B). Process 500 is shown in FIG. 2B to include step 502 where a data packet is received. For example, with reference to FIG. 2B, data packet 204 is received through interface 242 by path monitor 208. Referring back to FIG. 5, at step 504, the received packet is classified in accordance with earlier-discussed traffic classification methods. Next, at step 506, a determination is made as to whether a path is available for the packet (e.g., data packet 204) based on the classification made at step 504. For example, assuming PBR policies allow for priority classification based on the type of traffic, if at step 504, the classification (for example, of data packet 204) is determined to be of high priority, e.g., voice traffic, a path corresponding to the classification may be available. In some embodiments, a path is available not only based on classification but also based on its status as an active versus an inactive path. For example, a path may be selected based on its priority and by virtue of being an active path. In some embodiments, only active paths may be designated to correspond according to traffic classification. In response to the determination at step 506 yielding an available path, process 500 continues to step 510; otherwise, process 500 continues to step 508. At step 510, the data packet, received at step 502, is forwarded as part of a network traffic flow onto the selected path that is determined to be available at step 506.

At step 508, one or more active paths are retrieved from a routing table that is regularly updated from routing updates 516. At step 512, a path is selected from a list of active paths (from step 508) based on load balancing network path characteristics, such as telemetry data, as received and updated by the characteristics of active paths at 518. Next, the packet is forwarded as part of a network traffic flow onto the selected path, at step 514.

Figure 6:
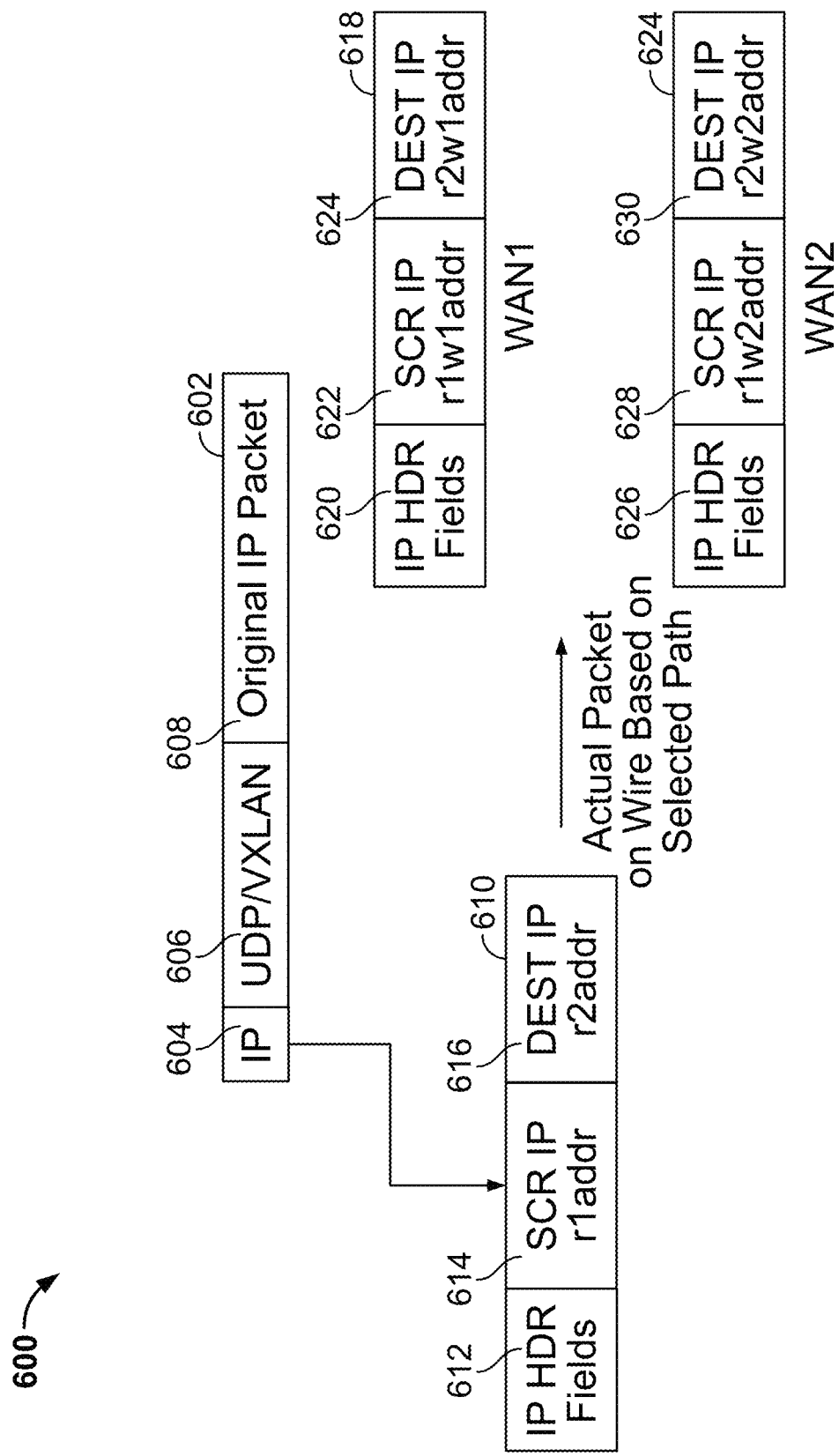
FIG. 6 shows an example data packet that is subject to disclosed adaptive load balancing techniques, in accordance with some embodiments of the disclosure.

As earlier noted, WANs are a common, but non-limiting, application of disclosed adaptive load balancing processes. In an example network environment with a WAN overlay using virtual extensible local area network (VxLAN) and MPLS tunneling, the WAN network router virtual tunnel endpoint (VTEP) IP addresses are router internal IP addresses and not routable over service provider networks, therefore posing a challenge to dynamic load balancing across service provider networks. Accordingly, in some embodiments, the VTEP IP address cannot be advertised over the MPLS tunnel. One way to overcome the challenge is employing service provider IP addresses because WAN interfaces have service provider routable IP addresses. FIG. 6 presents an implementation of the foregoing scenario.

FIG. 6 shows an example data packet that is subject to adaptive load balancing techniques, in accordance with disclosed adaptive load balancing embodiments. FIG. 6 shows a data packet conversion process 600 replacing the original data packet IP address field with publicly routable WAN IP address fields. FIG. 6 presumes a network environment with two routers, Router 1 and Router 2, in network communication with one another through two separate WANs, WAN1 and WAN2. Further assumed in the scenario of FIG. 6, next data packet hop can be reached through publicly routable WAN IP addresses, r1w1addr and r1w2addr. Accordingly, each of the routers needs to know the service provider routable IP addresses through which the router can reach each remote VTEP, through either static or dynamic address configurations.

Original data packet 602 is shown to include an IP address field 604, a protocol type field 606, and an IP packet data field 608. The IP address field 604 is replaced while the remaining fields of data packet 602 remain unchanged. IP address field 604 is replaced with IP address field 610 made of three distinct sub-fields, a header field and source and destination fields prior to the data packet 602 making the next hop from Router 1 to Router 2. That is, the three sub-fields of IP address field 610 are generated and replace the IP address field 604; the sub-fields are as follows: an IP header ("HDR") field 612 ("IP HDR Fields"), a (router) source ("SRC") IP address field 614 (SRC IP r1addr") and (router) destination ("DEST") IP address field 616 ("DEST IP r2addr"). The notation "r1addr" represents a Router 1 address and the notation "r2addr" represents a Router 2 address. If the next hop for data packet 602 from Router 1 to Router 2 is through WAN1, the IP address field more closely resembles IP address field 618 but if the next hop for data packet 602 from Router 1 to Router 2 is through WAN2, the IP address field more closely resembles IP address field 624.

Figure 7:
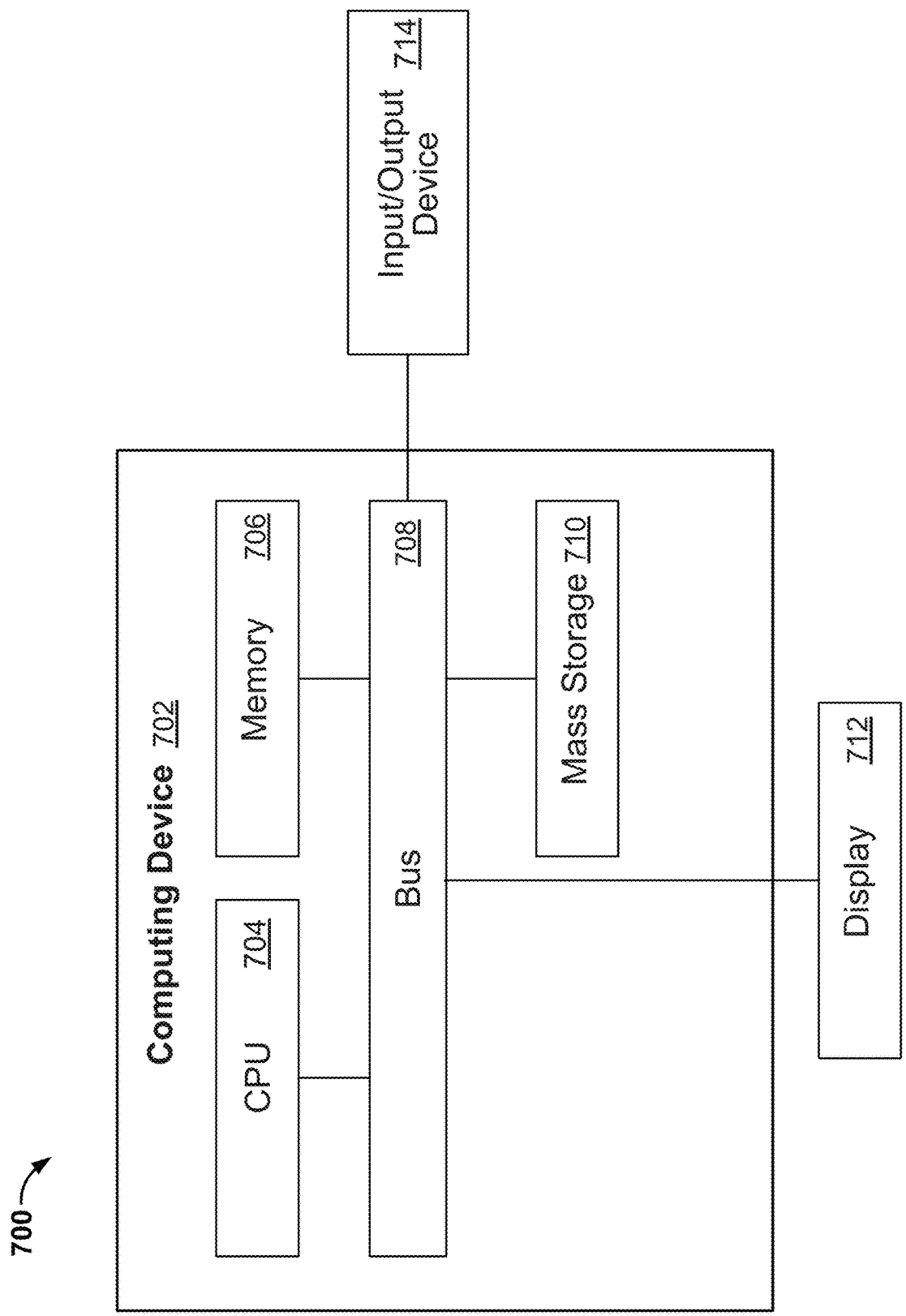
FIG. 7 shows a computing system implementation, in accordance with some embodiments of the disclosure.

It should be appreciated that the methods described herein may be performed with a digital processing system, such as a conventional, general-purpose computer system. Special-purpose computers, which are designed or programmed to perform only one function, may be used in the alternative. FIG. 7 shows a computing system in accordance with various embodiments of the disclosure. FIG. 7 is an illustration showing a computing system 700 including an exemplary computing device 702, which may implement the embodiments described herein. Computing system 700 is further shown in FIG. 7 to include a display 712 and an input/output device 714. The computing device 702 of FIG. 7 may be used to perform embodiments of the functionality for adaptive load balancing in accordance with some embodiments and methods. The computing device includes a central processing unit (CPU) 704, which is coupled through a bus 708 to a memory 706, and mass storage device 710. Mass storage device 710 represents a persistent data storage device such as a floppy disc drive or a fixed disc drive, which may be local or remote in some embodiments. The mass storage device 710 could implement a backup storage, in some embodiments. Memory 706 may include read-only memory, random access memory, etc. Applications resident on the computing device may be stored on or accessed via a computer-readable medium such as memory 706 or mass storage device 710 in some embodiments. Similarly, data, such as telemetry data, may be saved in memory 706. Applications may also be in the form of modulated electronic signals accessed via a network modem or other network interface of the computing device. It should be appreciated that CPU 704 may be embodied in a general-purpose processor, a special-purpose processor, or a specially programmed logic device in some embodiments.

In some embodiments, one or more or a combination of path monitor 208, path selector 212 and flow builder 216 may be implemented by execution of the program instructions in memory 706 or mass storage 710 by CPU 704.

Display 712 is in communication with CPU 704, memory 706, and mass storage 710, through bus 708. Display 712 is configured to display any visualization tools or reports associated with the system described herein. Input/output device 714 is coupled to bus 708 in order to communicate information in command selections to CPU 704. It should be appreciated that data to and from external devices may be communicated through the input/output device 714. CPU 704 can be defined to execute the functionality described herein to enable the functionality described with reference to FIGS. 1-6 and FIG. 8. The code embodying this functionality may be stored within memory 706 or mass storage 710 for execution by a processor such as CPU 704 in some embodiments. The operating system on the computing device may be MS DOS™, MS-WINDOWS™, OS/2™, UNIX™, LINUX™, or other known operating systems. It should be appreciated that the embodiments described herein may also be integrated with a virtualized computing system that is implemented with physical computing resources.

As it applies to some embodiments, measurement and monitoring of certain telemetry data to facilitate network load balancing may be application-, topology- and/or environmentally based. For certain network environments, measuring and monitoring latency and packet loss may prove adequate, but other network environments may be more effectively load balanced with the benefit of bandwidth availability measurements. Bandwidth awareness warns of potential upcoming path traffic congestion and bottlenecks, providing the opportunity to avoid traffic congestion through intelligent path selection.

When applied to network performance, telemetry data can provide look-ahead network health information and therefore the opportunity to act to prevent traffic-related issues. As previously discussed, network congestion knowledge based on path characteristics, such as, without limitation, jitter, latency, packet loss rate, and bandwidth availability, is applied in disclosed embodiments to achieve dynamic path selection and avoid network flows through congested network paths and/or nodes. In an embodiment, in addition to path characterization measurements, path characterization may be based on weighted round robin (WRR) to decide a service class path prioritization.

Figure 8:
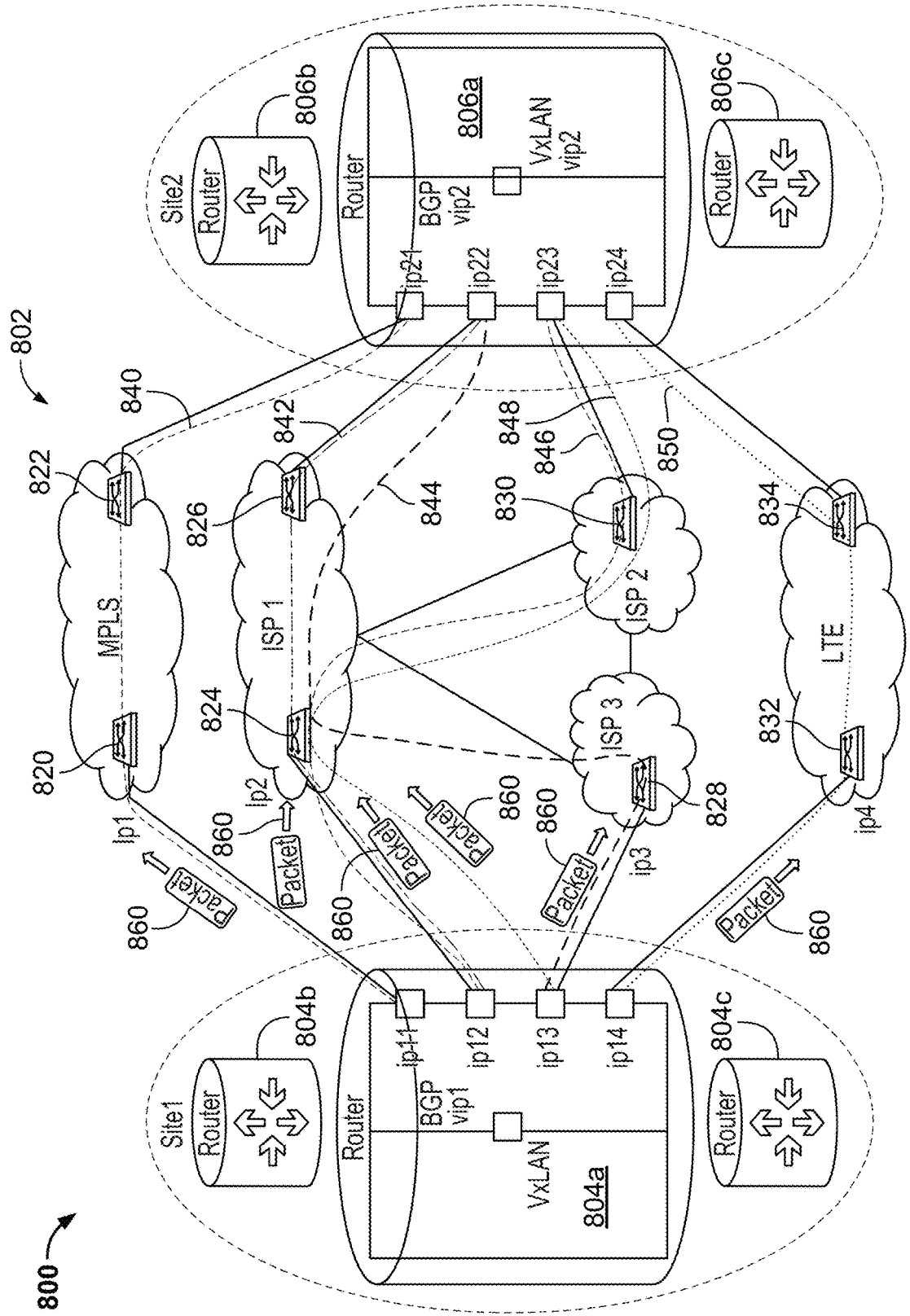
FIG. 8 shows an example WAN-based network system, in accordance with some embodiments of the disclosure.

FIG. 8 shows an exemplary WAN-based network system, in accordance with various disclosures. In FIG. 8, a network system 800 is disclosed in accordance with various embodiments of the disclosure. Data packets are made to selectively travel multiple WAN paths and nodes that connect two WAN network sites, Site 1 and Site 2. Each of the two network sites of network system 800 are shown with specific numbers of network elements (nodes), network paths (links), and subnets. It is understood that network topologies other than WAN and/or with a different combination of nodes, links, and subnets, e.g., greater or fewer number of routers, switches, and subnets shown in FIG. 8, may be employed and can enjoy similar dynamic path selection and load balancing outcomes as those discussed herein.

More specifically, network system 800 includes networks 802 comprising an MPLS network, an internet service provider 1 (ISP1) network, an ISP2 network, an ISP3 network, and an LTE network. Each of the foregoing networks may itself include one or more subnets. For the purpose of simplicity, each network in FIG. 8 is shown to include 1-2 routers as respective network elements, but it should be appreciated that the number of network elements and the network element types shown in FIG. 8 are arbitrary, and any other number of network elements or other suitable network element types may be employed. In the depicted example, MPLS network includes routers 820 and 822; ISP1 network includes routers 824 and 826; ISP2 network includes router 830; ISP3 network includes router 828, and LTE network includes routers 832 and 834.

Each of Sites 1 and 2 may include a host (for example, a server, router, or other suitable types of network elements) that transmits network packets to and receives network packets from one of several optional WAN edge routers (nodes) and through one of several network paths (links) based on traffic congestion.

Site 1 is shown to include network routers 804 and Site 2 is shown to include network routers 806. In a non-limiting example, routers 804 comprise routers 804*a*-804*c*, and routers 806 comprise routers 806*a*-806*c*. In Site 1, one or more of the routers 804 may be presumed to be a host router, and one or more of the routers 804 may be presumed to be an edge router. Similarly, in Site 2, one or more of the routers 806 may be presumed to be a host router, and one or more of the routers 806 may be presumed to be an edge router. Dynamic load balancing algorithms, as disclosed herein, may be implemented by a host router or an edge router of each of Site 1 and Site 2. For the purpose of discussion, routers 804*a* and 806*a* are presumed to implement a dynamic load balancing process for a corresponding site.

Data packets from a site host (node or source) are routed, by a respective transmitting router, traveling through one of paths 840-850 before being received by a receiving router and routed to a router (in the opposite site). In the example of FIG. 8, again, for the purpose of simplicity, router 804*a*, at Site 1, is selected to route a data packet from Site 1, through a WAN subnet path, to be received by router 806*a* at Site 2. A data packet can travel through many combinations of a number of nodes and links in FIG. 8 prior to reaching its final destination. Disclosed dynamic path selection processes and techniques determine an optimized path to achieve load balance. For example, a data packet chartered to travel a congested path, one that is predicted with bandwidth bottleneck, is redirected to a path with no predicted bandwidth bottleneck.

In some cases, path selection is based on path characterization in addition to the class of traffic. For example, for voice traffic, an example of critical traffic, the least latency-fraught path may be selected, whereas, for video streaming traffic, such as from YouTube, non-critical traffic, latency may be a characteristic of less comparative significance and a jitter-minimized path may be a more suitable option.

In some embodiments, system 800 may support multiple sessions per path where sessions are identified by path telemetry port numbers, for example. In some embodiments, different sessions are used for different classes of traffic. Path telemetry may be measured separately for each session or traffic class.

As earlier indicated, in FIG. 8, six networks provide various path options for a traveling data packet, such as data packet 860, between Sites 1 and 2.

Exemplary data packet travel paths between Sites 1 and 2 are labeled paths 840-850. It is understood that a data packet may travel paths not shown in FIG. 8 and discussed herein.

In an exemplary congestion control path selection process, an audio network packet, originating from Site 1 router 804*a*, can travel through path 842 onto and through nodes and links of ISP1 and received by one of three receiving routers, routers 806*a*, 806*b*, and 806*c*. In the example of FIG. 8, path 842 takes the packet to router 806*a*, at Site 2, to experience the least congested path, at the time of travel, based on certain path characteristic factors. In some embodiments, each of the routers 804*a* and 806*a* is a WAN edge router. In the example of FIG. 8, in traveling path 842, packet 860 is transmitted from an egress interface at router 804*a*, identified by IP address ip12, through routers 824 and 826 of ISP1 network and received at an ingress interface of router 806*a*, identified by IP address ip22, at Site 2. Based on telemetry data, data packet 860 may also travel through path 840, from ip11 at router 804*a*, through routers 820 and 822 at MPLS network, to ip21 at router 806*a* of Site 2; path 844, from ip13 at router 804*a*, through router 828 of ISP3 network and router 824 of ISP1 network, to ip22 at router 806*a* of Site 2; path 846, from ip12 at router 804*a*, through router 824 of ISP1 network and router 830 of ISP2 network, to ip23 at router 806*a* of Site 2; path 848, from ip13 at router 804*a*, through router 824 of ISP1 network and router 830 of ISP2 network, to ip23 at router 806*a* of Site 2; and path 850, from ip14 at router 804*a*, through routers 832 and 834 of LTE network, to ip24 at router 806*a* of Site 2. Data packets originating from Site 2 can similarly travel the least congested path and nodes to reach their destination at Site 1. Additionally, data packets can be dynamically steered through and within the least congested subnet to avoid heavy network traffic effects.

In some embodiments, router addresses of routers of each site may be configured statically or dynamically although static address configuration may be relatively cumbersome for scaling sites. Whereas, in a dynamic configuration, sites may be scaled with greater ease. In accordance with an example approach, router 804*a* can advertise reachability of VXLAN, identified by virtual IP address 1 (vip1), through ip11, ip12, ip13 and ip14 interfaces. When exchanging IP addresses, additional network element attributes like network type, i.e., WAN type of MPLS, internet or LTE network, to which the IP address belongs may additionally need to be exchanged.

It will be apparent to those of ordinary skill in the art that methods involved in the present invention may be embodied in a computer program product that includes a computer-usable and/or -readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method of load balancing in a network comprising:
   receiving network telemetry data corresponding to network paths of a plurality of coexisting multipaths;
   performing an adaptive load balancing process by:
      determining whether a network path from the plurality of coexisting multipaths is an adequate network path includes comparing the network telemetry data to a threshold, the threshold being based on measurements taken over the plurality of coexisting multipaths under an ideal condition or a near ideal network condition having no network traffic; and
      in response to determining the network path is an adequate network path, selecting the network path for a network flow.

2. The method of claim 1, further comprising:
   building a list of "best paths" from the adequate network paths of the plurality of coexisting multipaths; and
   selecting the network path for the network flow from the list of best paths.

3. The method of claim 2, wherein the list of best paths is arranged in a round-robin fashion.

4. The method of claim 1, further comprising repeating the adaptive load balancing process for at least some of the network paths of the plurality of coexisting multipaths.

5. The method of claim 1, wherein the adaptive load balancing process is in conformance with transmission control protocol (TCP) of the internet protocol (IP) suite.

6. The method of claim 1,
   wherein selecting the network path for a network flow is based on an inequality between a bandwidth of the network path and a bandwidth of a second network path of the plurality of coexisting multipaths,
   wherein the bandwidth of the network path is near bandwidth capacity, and
   wherein the method further comprises:
      removing the network path from a list of best paths to prevent the network path from selection for the network flow.

7. The method of claim 6, further comprising replacing the network path in the list of best paths with a third network path of the plurality of coexisting multipaths, the third network path of the plurality of coexisting multipaths having a bandwidth at least greater than the bandwidth of the network path.

8. The method of claim 1, wherein the network telemetry data is based at least in part on network path latency, network path jitter, network path packet loss, or a combination thereof.

9. The method of claim 1, further comprising:
   deriving an available bandwidth for each of the network paths of the plurality of coexisting multipaths based on the network telemetry data;
   based on the available bandwidth, determining, for each network path of the plurality of coexisting multipaths, to select a corresponding network path for a corresponding network flow; and
   in response to determining to select a corresponding network path for a corresponding network flow, forwarding the corresponding network flow based on the corresponding network path onto the network.

10. The method of claim 1, wherein performing the adaptive load balancing process is done dynamically.

11. The method of claim 1, further comprising performing the receiving network telemetry data at periodic intervals.

12. The method of claim 1, wherein an indicator represents a path bandwidth corresponding to path saturation and forms a basis for the determining to select the network path for a network flow.

13. A network element for load balancing in a network comprising:
   memory configured to store program instructions;
   a processor configured to execute the stored program instructions, wherein execution of the stored program instructions causes a path selection engine to:
      perform an adaptive load balancing process to:
         receive network telemetry data corresponding to each network path of a plurality of coexisting multipaths,
         determine whether a network path from the plurality of coexisting multipaths is an adequate network path based on the network telemetry data; and
         in response to a determination that the network path is an adequate network path, select the network path for a network flow, wherein:
            the selecting the network path for a network flow is based on an inequality between a bandwidth of the network path and a bandwidth of a second network path of the plurality of coexisting multipaths,
            the bandwidth of the network path is near bandwidth capacity, and
            further execution of the stored program instructions causes the path selection engine to:
               remove the network path from a list of best paths to prevent the network path from selection for the network flow.

14. The network element of claim 13, wherein further execution of the stored program instructions causes the path selection engine to:

build a list of best paths from the adequate network paths of the plurality of coexisting multipaths; and select the network path for a network flow from the list of best paths.

15. The network element of claim 14, wherein the list of best paths is arranged in a round-robin fashion.

16. The network element of claim 13, wherein further execution of the stored program instructions causes the path selection engine to repeat the adaptive load balancing process for at least some of the network paths of the plurality of coexisting multipaths.

17. The network element of claim 13, wherein the adaptive load balancing process is in conformance with transmission control protocol (TCP) of the internet protocol (IP) suite.

18. The network element of claim 13, wherein further execution of the stored program instructions causes the path selection engine to:

replace the network path in the list of best paths with a third network path of the plurality of coexisting multipaths, the third network path of the plurality of coexisting multipaths having a bandwidth at least greater than the bandwidth of the network path.

19. The network element of claim 13, wherein the network telemetry data is based at least in part on network path latency, network path jitter, network path packet loss, or a combination thereof.

20. The network element of claim 13, wherein further execution of the stored program instructions causes the path selection engine to:

derive an available bandwidth for each of the network paths of the plurality of coexisting multipaths based on the network telemetry data;

based on the available bandwidth, determine, for each network path of the plurality of coexisting multipaths, to select a corresponding network path for a corresponding network flow; and in response to a determination to select a corresponding network path for a corresponding network flow, forward the corresponding network flow based on the corresponding network path onto the network.

21. The network element of claim 13, wherein further execution of the stored program instructions causes the path selection engine to receive the network telemetry data at periodic intervals.

22. The network element of claim 13, wherein an indicator represents a path bandwidth corresponding to path saturation and forms a basis for the determination to select the network path for a network flow.

23. The network element of claim 13, wherein determining whether a network path from the plurality of coexisting multipaths is an adequate network path includes comparing the network telemetry data to a threshold, the threshold being based on measurements taken over the plurality of coexisting multipaths under an ideal condition or a near ideal network condition having no network traffic.

* * * * *